United States Patent
Akahane

(10) Patent No.: US 8,493,632 B2
(45) Date of Patent: Jul. 23, 2013

(54) IMAGE READING APPARATUS

(75) Inventor: Takuya Akahane, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 280 days.

(21) Appl. No.: 13/092,097

(22) Filed: Apr. 21, 2011

(65) Prior Publication Data

US 2011/0261417 A1    Oct. 27, 2011

(30) Foreign Application Priority Data

Apr. 22, 2010    (JP) ................................. 2010-098569

(51) Int. Cl.
*H04N 1/40* (2006.01)

(52) U.S. Cl.
USPC ............. 358/461; 358/1.1; 358/458; 358/1.9; 358/3.24; 382/274

(58) Field of Classification Search
USPC .... 358/461, 1.9, 488, 3.24; 348/234; 382/274
See application file for complete search history.

(56) References Cited

U.S. PATENT DOCUMENTS

| | | | |
|---|---|---|---|
| 6,292,269 B1 * | 9/2001 | Kawai | 358/1.9 |
| 2006/0209312 A1 * | 9/2006 | Shoda | 358/1.1 |
| 2007/0285730 A1 * | 12/2007 | Suzuki et al. | 358/3.24 |
| 2009/0160971 A1 * | 6/2009 | Jung et al. | 348/229.1 |
| 2010/0157387 A1 * | 6/2010 | Chen | 358/488 |

FOREIGN PATENT DOCUMENTS

JP    2006-303710 A    11/2006

* cited by examiner

*Primary Examiner* — Twyler Haskins
*Assistant Examiner* — Michael Burleson
(74) *Attorney, Agent, or Firm* — Kilpatrick Townsend & Stockton LLP

(57) ABSTRACT

An image reading apparatus includes a gain setting section that sets a gain of a signal from image sensor, a reference data reading section that reads white and black reference data, an image reading section, a correction data generation section that generates correction data by synthesizing a substring extracted from white reference data with a substring extracted from black reference data, and a correction section that performs shading correction of image data using the correction data, wherein in a case where the black reference data is equal to or greater than a predetermined threshold value, the gain setting section performs resetting to lower the set gain, the reference data reading section rereads the black reference data by the reset gain, and the correction data generation section generates correction data by synthesizing the substring of the white reference data with the substring of the black reference data that has been reread.

4 Claims, 4 Drawing Sheets

FIG. 3

| B[X]_MAX | B[X] BIT APPLIED TO M[X] | |
|---|---|---|
| | BIT APPLIED INTO HIGHER ORDER 8 BITS | BIT APPLIED INTO LOWER ORDER 8 BITS |
| 0 ≤ B[X]_MAX < 2 | 8 | [7:1] |
| 2 ≤ B[X]_MAX < 4 | [9:8] | [7:2] |
| 4 ≤ B[X]_MAX < 8 | [10:8] | [7:3] |
| 8 ≤ B[X]_MAX < 16 | [11:8] | [7:4] |
| 16 ≤ B[X]_MAX < 32 | [12:8] | [7:5] |
| 32 ≤ B[X]_MAX < 64 | [13:8] | [7:6] |

IMAGE READING APPARATUS

The entire disclosure of Japanese Patent Application No. 2010-098569, filed Apr. 22, 2010 is expressly incorporated by reference herein.

BACKGROUND

1. Technical Field

The present invention relates to an image reading apparatus.

2. Related Art

There are image reading apparatuses, such as scanner apparatuses, in which shading correction is performed ahead of reading of an original document, in order to prevent unevenness in the read image due to non-uniformity in the light amount of a light source lamp, variations in the sensitivity of image reading elements, and the like (for example, see JP-A-2006-303710). White reference data, black reference data, and the like that have been quantized are used in shading correction.

As the number of gradations increases, quantized data can be expressed more finely and with higher accuracy. Consequently, shading correction can be performed with high accuracy by using white reference data or black reference data having a high number of gradations.

However, in an image reading apparatus with a narrow memory band, since data having a high number of gradations (high number of bits) cannot be rapidly processed, there is a case when shading correction is performed by decreasing the number of gradations of white reference data, black reference data, and the like to below the number of gradations of a read image. In particular, in a case of decreasing the number of gradations (number of bits) of black reference data, quantization errors may increase as data of lower order bits is insufficient, and an image after a shading process may be deteriorated.

SUMMARY

An advantage of some aspects of the invention is to provide a technique for preventing image deterioration after a shading process caused by a decrease in the number of gradations of black reference data.

According to an aspect of the invention, there is provided an image reading apparatus including: a gain setting section that sets a gain of a signal output by an image sensor; a reference data reading section that reads white reference data and black reference data amplified by the gain; an image reading section that reads image data amplified by the gain; a correction data generation section that generates correction data by synthesizing a substring extracted from the white reference data with a substring extracted from the black reference data; and a correction section that performs shading correction of the image data read by the image reading section by using the correction data, wherein in a case where the black reference data is equal to or greater than a predetermined threshold value L, the gain setting section performs resetting to lower the gain that has been set, the reference data reading section rereads the black reference data by the reset gain, and the correction data generation section generates correction data by synthesizing the substring of the white reference data with the substring of the black reference data that has been reread.

BRIEF DESCRIPTION OF THE DRAWINGS

The invention will be described with reference to the accompanying drawings, wherein like numbers reference like elements.

FIG. 3 is a diagram illustrating the relationship between the maximum brightness value of the black reference data and the position of a substring (8 bits) extracted from the black reference data.

DESCRIPTION OF EXEMPLARY EMBODIMENTS

Hereinbelow, an example of an embodiment of the invention will be described with reference to the drawings.

Figure 1:
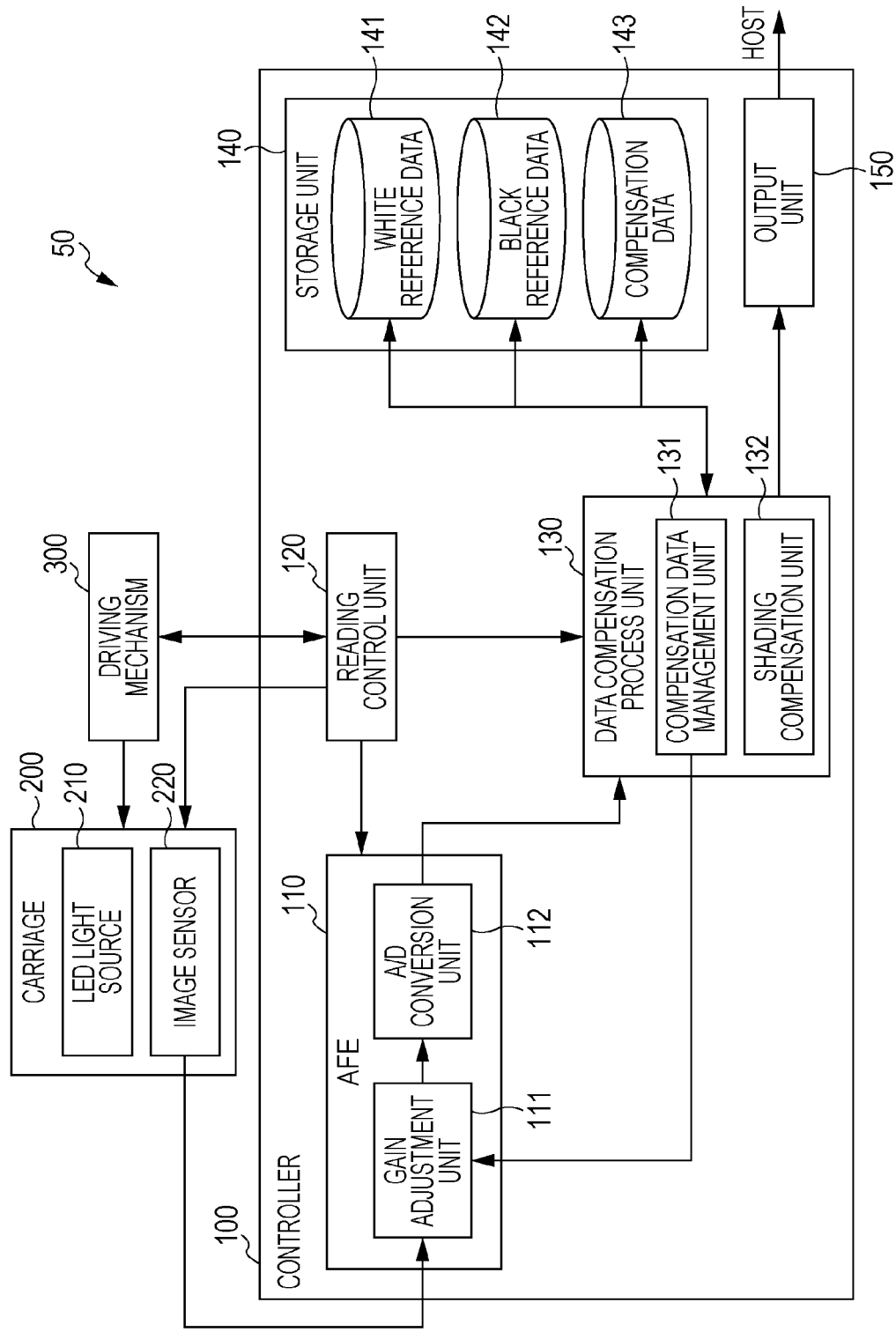
FIG. 1 is a block diagram illustrating an example of an outline configuration of an image reading apparatus of the invention.

FIG. 1 is a block diagram illustrating an example of an outline configuration of an image reading apparatus 50 in which an embodiment of the invention is applied.

The image reading apparatus 50 is a so-called flatbed type image reading apparatus provided with a platen (not shown) on an upper surface of the housing. The image reading apparatus 50 reads an image of an original document placed on a transparent plate platen by scanning an image sensor 220.

Further, the image reading apparatus 50 includes a mechanism for generating white reference data used for performing shading correction. In the embodiment, the image reading apparatus 50 is provided with, for example, a white reference plate (not shown) that is a uniform reflecting surface having high reflectance on an upper surface of the housing. The image reading apparatus 50 reads the white reference plate by an image sensor 220 by emitting (lighting) an LED light source 210.

Further, although black reference data is also used in a general shading correction, the image reading apparatus 50 is not provided with a special mechanism for generating black reference data. The image reading apparatus 50 generates black reference data by, for example, reading image data in a state where the LED light source 210 is turned off.

As shown in the drawings, the image reading apparatus 50 is provided with a carriage 200 on which the LED light source 210 and the image sensor 220 are installed, a driving mechanism 300 that controls the movement of the carriage 200, and a controller 100 that controls the whole of the image reading apparatus 50 and performs a variety of processes for reading an image.

The carriage 200 transports the image sensor 220 in a sub-scanning direction, along with the LED light source 210. The carriage 200 is locked so as to freely slide along a shaft or the like that is a guide parallel to a board surface of the platen, and is pulled by a belt rotated by a motor (for example, a DC motor) of the driving mechanism 300. The movement amount of the carriage 200 is controlled by an output value of an encoder that outputs pulses according to the rotation amount of the motor of the driving mechanism 300.

The LED light source 210 is formed from a red (R) LED, a green (G) LED, and a blue (B) LED, and emits light of the three colors of RGB in a predetermined order. In the embodiment, in a case of performing reading corresponding to one line of a regular original document or white reference plate, the LED light source 210 emits light in the order of the red LED, the green LED, and the blue LED. Then, the LED light source 210 repeats the same emitting action in order to perform a reading corresponding to the number of lines required to generate image data or white reference data of the original document. The emitting time of each color of LED is determined in advance for each color, and when this determined time from lighting elapses, the light is turned off. In addition, the emitting order in a case of performing a reading corresponding to one line is not limited to the RGB order.

The image sensor 220 receives light that is reflected from an original document, accumulates an electric charge according to the amount of received light, and sends the light to the controller 100 as read image data (electrical signal).

The image sensor 220 is formed of a plurality of sensor chips that is lined up in the main scanning direction. Each sensor chip is provided with the same configuration as a regular CIS (Contact Image Sensor) or CCD (Charge Coupled Device) image sensor. That is, each sensor chip is provided with a photoelectric conversion element (photodiode), a shift gate, and a shift register. Then, each sensor chip opens the shift gate and transfers the electric charge accumulated in the photoelectric conversion element to the shift register, and outputs the electric charge while sequentially moving the electric charge by the shift register.

Opening of the shift gate (transfer of electric charge) is performed corresponding to the application of a shift pulse (signal from a reading control unit 120 described later). Since the photoelectric conversion element ordinarily accumulates electric charge according to the amount of received light, the transfer timing of the electric charge to the shift register becomes the start timing of accumulating electric charge relating to light of the next emitting color. The electric charge that is transferred to the shift register is converted into an electric signal (analog data) by an output unit of an end of the shift register, and is sent to an AFE (Analog Front End) 110.

Output of the electric charge stored in the shift register is performed in response to a predetermined read-out clock (signal from the reading control unit 120 described later). For example, the electric charge for one pixel is output as analog data for every clock.

The controller 100 is provided with the AFE 110 that performs an analog process (for example, converting analog data output by the image sensor 220 into digital data); a data correction process unit 130 that performs each type of correction with regard to digital data output by the AFE 110; a storage unit 140 that stores digital data (white reference data and black reference data described above) for the data correction process unit 130 to perform each type of correction; an output unit 150 for sending data from the data correction process unit 130 to a host such as a personal computer; and the reading control unit 120 that controls the LED light source 210 inside the carriage 200, the image sensor 220, and the driving mechanism 300, as well as generally controlling each functional unit inside the controller 100.

The reading control unit 120 controls the movement of the carriage 200 by controlling the rotation of the motor of the driving mechanism 300.

Further, the reading control unit 120 controls the image reading, white reference data reading, and black reference data reading by the image sensor 220.

Specifically, the reading control unit 120 performs provision of a shift pulse to the image sensor 220 and controls the transfer timing (start timing of next electric charge accumulation) of the accumulated electric charge in the photoelectric conversion element to the shift register. Further, the reading control unit 120 performs supply of a read-out clock to the image sensor 220 and controls output of the electric charge stored in the shift register to the AFE 110.

Moreover, the reading control unit 120 controls the turning on and off of the LED light source 210 by matching with the reading action of the image sensor 220.

In addition, the shift pulse and the reading clock may be generated by, for example, a timing generator that generates each type of signal based on the clock of a reference output by the reading control unit 120. The timing generator can be established, for example, on the carriage 200. Naturally, the timing generator may also be provided on the controller 100.

The AFE 110 is configured by a predetermined IC (so-called analog front end IC). The AFE 110 includes a gain adjustment unit 111 and an A/D conversion unit 112.

Analog data (waveform) that is supplied to the AFE 110 from the image sensor 220 is clamped by a reference unit and a data unit is sampled for each pixel of image data, and the difference therebetween is input to the gain adjustment unit 111.

The gain adjustment unit 111 performs gain adjustment (control to increase or decrease an input signal by a set gain G) with regard to input analog data in order to supply a required level of signal to the A/D conversion unit 112. Further, the gain adjustment unit 111 modifies the gain G based on an instruction from a correction data management unit 131 described later.

The A/D conversion unit 112 converts (quantizes) gain adjusted analog data into digital data and outputs the digital data to the data correction process unit 130.

The data correction process unit 130 conducts each type of correction, such as shading correction, on the digital data output by the AFE 110 and outputs the digital data to the output unit 150.

The data correction process unit 130 includes, as illustrated, the correction data management unit 131 that manages data (white reference data, black reference data, correction data) used in shading correction and a shading correction unit 132 that performs shading correction.

The correction data management unit 131 stores each of white reference data and black reference data output by the AFE 110 in the storage unit 140.

Here, the storage unit 140 is realized by a memory and the like that stores data for the data correction process unit 130 to perform each type of correction process. Specifically, the storage unit 140 includes a white reference data DB 141 for storing white reference data and a black reference data DB 142 for storing black reference data.

Incidentally, in an image reading apparatus with a narrow memory band, data with a high number of gradations (high number of bits) cannot be processed rapidly. For this reason, the image reading apparatus 50 of the embodiment decreases the number of gradations of white reference data, black reference data, and the like to below the number of gradations of a read image.

Specifically, the correction data management unit 131 decreases the number of gradations by extracting a part of the black reference data (N bits) stored in the black reference data DB 142, as well as decreasing the number of gradations by extracting a part of the white reference data (N bits) stored in the white reference data DB 141. Then, the correction data management unit 131 synthesizes a substring (M bits) extracted from the white reference data with a substring (M bits) extracted from the black reference data and generates the correction data (N bits) used in shading correction. In addition, N is the number of bits of a read image (each pixel), where N=M+M is satisfied.

Figure 2:
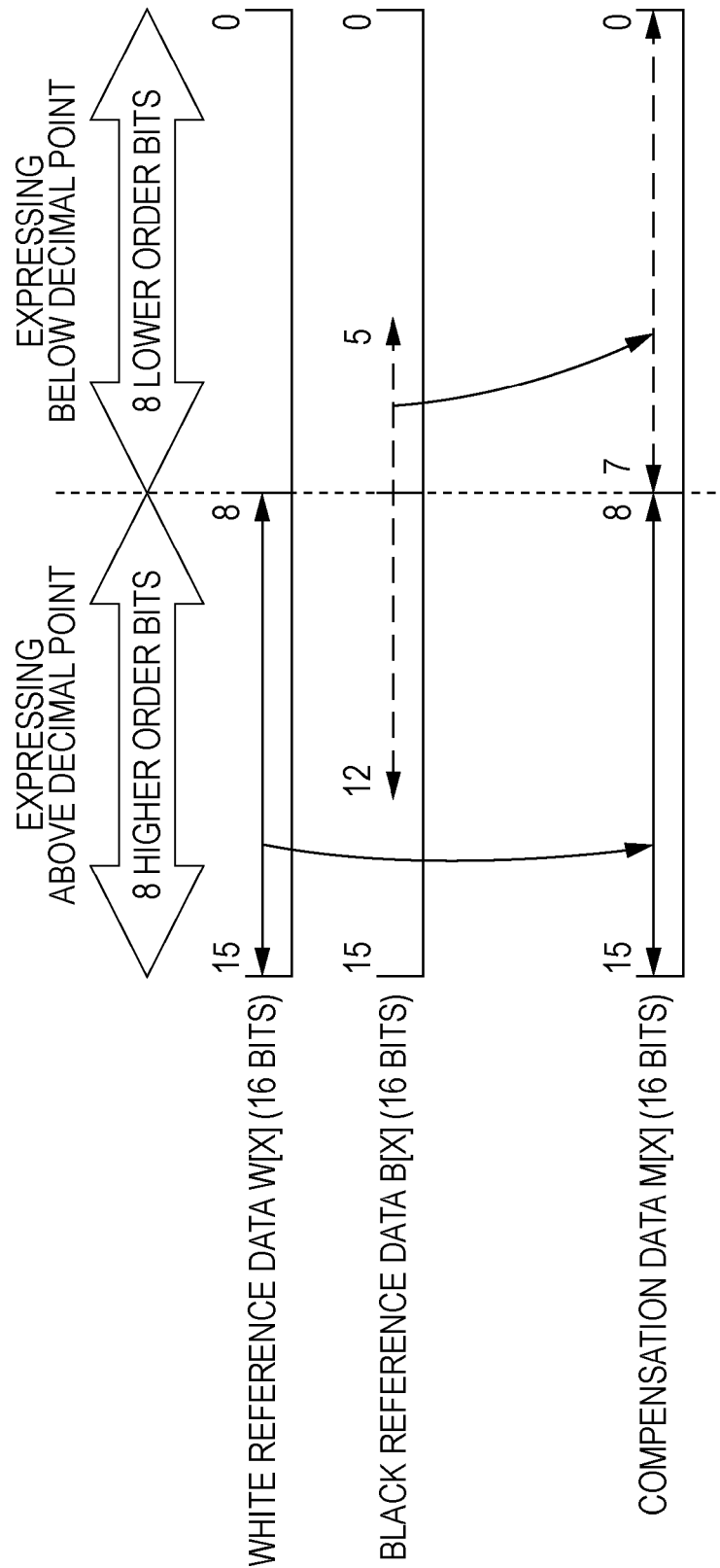
FIG. 2 is a diagram illustrating an outline data configuration of white reference data to be stored in a white reference data DB, black reference data to be stored in a black reference data DB, and correction data to be generated.

FIG. 2 is a diagram illustrating an outline data configuration of white reference data W[X] to be stored in the white reference data DB 141, black reference data B[X] to be stored in the black reference data DB 142, and correction data M[X] to be generated.

As illustrated, in the embodiment, each of the number of bits (each pixel) of the white reference data W[X] to be stored in the white reference data DB 141, the number of bits (each pixel) of the black reference data B[X] to be stored in the black reference data DB 142, and the number of bits (each pixel) of the correction data M[X] is 16 bits (that is, N=16). The white reference data W[X] and the black reference data B[X] are each configured so as for the 8 higher order bits to be a value above a decimal point, and the 8 lower order bits to be a value below a decimal point.

Then, when the correction data management unit 131 generates the correction data M[X], a substring having 8 bits (that is, M=8) is extracted from the white reference data W[X] having 16 bits. Here, while the substring to be extracted may be a substring of an arbitrary position, the brightness value of the white reference data W[X] is generally high, and in order to obtain an effective value as the white reference data, the correction data management unit 131 extracts the 8 higher order bits (range of the solid arrow as illustrated).

In addition, the correction data management unit 131 extracts a substring having 8 bits (M=8) from the black reference data B[X] having 16 bits. Specifically, the correction data management unit 131 extracts a substring corresponding to 8 bits toward the lower order (range of the solid arrow as illustrated) from the highest order bit (hereinafter referred to as "effective highest order bit Z") on which an effective value exists.

Generally, the brightness value of the black reference data B[X] is low, and in order to obtain an effective value as the black reference data, the correction data management unit 131 preferably extracts a substring of black reference data to include an appropriate bit row below the decimal point.

However, depending on the set value (gain G) at the gain adjustment unit 111 of the AFE 110, the position of the effective highest order bit Z (fifth place of an integer portion "12" in the illustrated example) may become higher than anticipated, and if a substring corresponding to 8 lower order bits from that position is extracted, the bit row of below the decimal point (three bits of "5" to "7" in the illustrated example) may become scarce. In such a case, an error (quantization error) between the black reference data B[X] (16 bits) that is the extraction source and the extracted substring (8 bits) becomes large, and shading correction cannot be performed with high accuracy.

FIG. 3 is a diagram illustrating the relationship between a maximum brightness value B[X]_MAX of the black reference data and a position of a substring (8 bits) extracted from the black reference data B[X]. In addition, the maximum brightness value B[X]_MAX of the black reference data indicates the highest brightness value of all pixels included in one line.

As illustrated, in a case where the maximum brightness value B[X]_MAX of the black reference data is equal to or greater than 0 and less than 2 (or when the effective highest order bit Z becomes a position of the first place of an integer portion), the substring that is extracted from the correction data management unit 131 is configured by 1 bit of a position "8" that is above the decimal point and 7 bits of a range from "1" to "7" that is below the decimal point. Similarly, in a case where the maximum brightness value B[X]_MAX of the black reference data is equal to or greater than 2 and less than 4 (or when the effective highest order bit Z becomes a position of the second place of an integer portion), the substring that is extracted by the correction data management unit 131 is configured by 2 bits of a range from "8" to "9" that is above the decimal point and 6 bits of a range from "2" to "7" that is below the decimal point. The other examples are as illustrated in the diagrams.

Then, in a case where the maximum brightness value of black reference data B[X]_MAX is equal to or greater than 32 and less than 64 (or when the effective highest order bit Z becomes a position of the fifth place of an integer portion), there are only two bits below the decimal point of a range from "6" to "7" of a substring extracted by the correction data management unit 131.

Accordingly, in a case where the maximum value of the black reference data B[X]_MAX is equal to or greater than a predetermined threshold value L ($=2^K$) (or when the effective highest order bit Z becomes equal to or greater than the K position integer portion) (for example, K=5, L=32), since the number of bits (M-K bits) below the decimal point included in a substring (M bits) that is scheduled for extraction becomes equal to or less than the minimum number of bits (for example, 2 bits) required to maintain high accuracy of shading correction, the correction data management unit 131 of the embodiment modifies (resets) the set value (gain G) of the gain adjustment unit 111. In addition, the correction data management unit 131 requests reacquisition of the black reference data by the reading control unit 120. Then, the correction data management unit 131 re-extracts a substring used in shading correction from the reacquired black reference data B[X].

By doing so, data including an appropriate amount (for example, equal to or more than 3 bits) of bit rows of below the decimal point can become extractable from the black reference data B[X], and it becomes possible to perform shading correction with high accuracy.

Then, as illustrated in FIG. 2, the correction data management unit 131 generates the correction data M[X] by synthesizing a substring extracted from the white reference data W[X] (range of solid arrow) with a substring extracted from the black reference data B[X] (range of dotted arrow). In addition, the generated correction data M[X] is matched with the number of bits (16 bits in the illustrated example) of a read image (image data) (N=M+M).

Further, returning to FIG. 1, the correction data management unit 131 stores the generated correction data M[X] in the storage unit 140. In addition, as illustrated, the storage unit 140 further includes a correction data DB 143 for storing the correction data M[X].

The shading correction unit 132 performs shading correction following a predetermined correction formula with regard to a read image (image data) output by the AFE 110 for each corresponding pixel, by using correction data M[X] generated by the correction data management unit 131.

The output unit 150 is provided with an interface for performing network connection or USB connection and sends digital data that is output by the data correction process unit 130 to a host computer.

The main constituent elements of the controller 100 described above can be accomplished by a general computer provided with a CPU that is a calculation apparatus, a ROM in which a program or the like is recorded, a RAM that temporarily stores data and the like as main memory, an interface that controls the inputting and outputting between a host and the like, and a system bus that becomes a communication pathway between each constituent element. The controller 100 may include an ASIC (Application Specific Integrated Circuit) that is designed to exclusively perform a specific process, or may be configured by the ASIC.

The image reading apparatus 50 adopting the embodiment is configured as described above. However, this configuration is one that describes the main configuration in order to describe the characteristics of the invention, and is not limited to the configuration described above. Further, the configuration does not exclude other configurations provided in a general image reading apparatus. Further, the image reading apparatus 50 may be a multifunction apparatus including a printing function or a facsimile function. Further, the A/D conversion unit 110 may be installed on a substrate inside the carriage 200.

Further, each constituent element described above has been categorized according to main process contents, in order to facilitate understanding of the configuration of the image reading apparatus 50. The invention is not limited by the means of categorization or the names of the constituent elements. The configuration of the image reading apparatus 50 can be categorized into still more constituent elements according to process contents. Further, one constituent element can be categorized so as to execute still more processes. Further, the processing of each constituent element may be executed by one hardware item or may be configured by a plurality of hardware items.

Next, characteristic actions of the image reading apparatus 50 configured as described above will be described.

Image Reading Process

Figure 4:
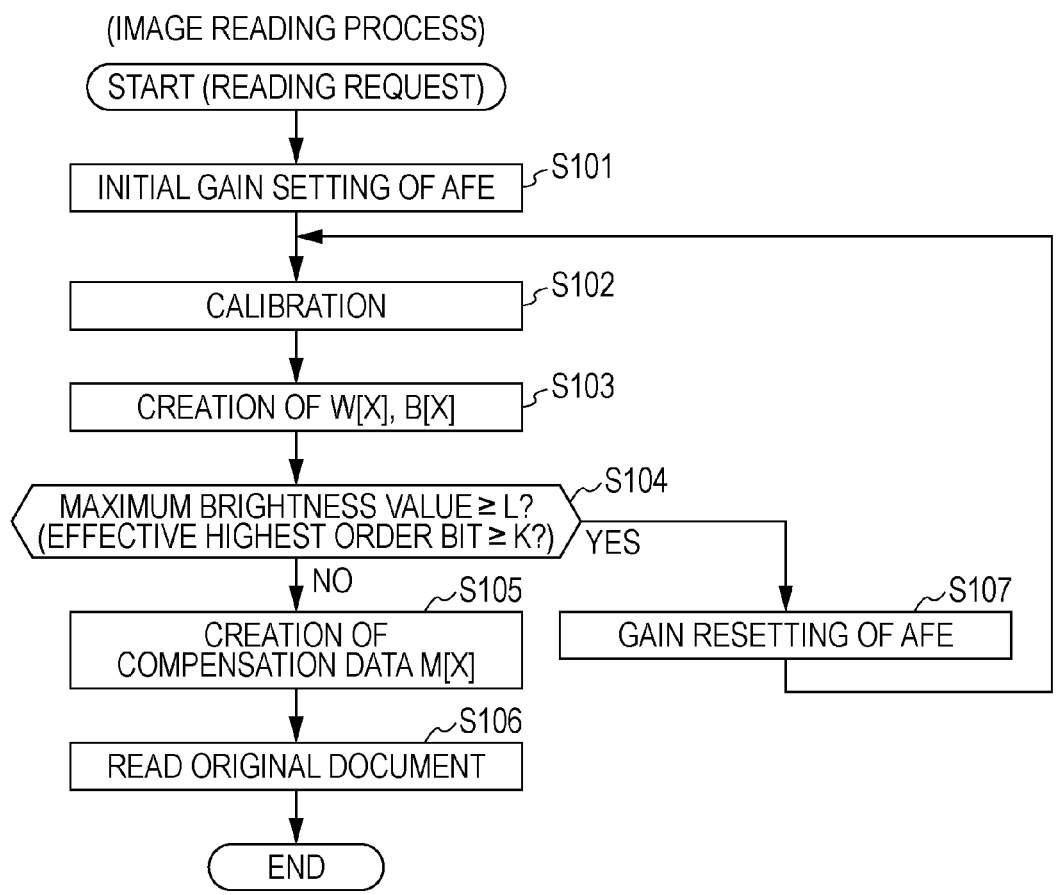
FIG. 4 is a flowchart for describing an example of an image reading process executed by the image reading apparatus.

FIG. 4 is a flowchart for describing an example of an image reading process (reading process of an original document) executed by the image reading apparatus 50 of the embodiment.

The reading control unit 120 of the image reading apparatus 50 starts the flow at a predetermined timing. For example, the reading control unit 120 starts the flow at a timing when a reading request of the original document is made.

When the flow is started, the reading control unit 120 performs initial setting for gain adjustment of the gain adjustment unit 111 of the AFE 110, ahead of reading of an original document (Step S101). Specifically, the reading control unit 120 adopts the gain G of the gain adjustment unit 111 as a set value registered in advance (specified by a user).

Then, the reading control unit 120 performs calibration (Step S102). Specifically, the reading control unit 120 performs adjustment so that a light amount of the LED light source 210 becomes appropriate.

Next, the reading control unit 120 performs reading of the white reference data W[X] and the black reference data B[X] (Step S103).

Specifically, in a case of reading the white reference data W[X], the reading control unit 120 makes the LED light source 210 emit light (light), performs provision of a shift pulse to the image sensor 220, and accumulates an electric charge based on light reflected by a white reference plate in the photoelectric conversion element. After a predetermined length of time passes, the reading control unit 120 instructs transfer of the electric charge accumulated in the photoelectric conversion element to the shift register, by performing provision of a new shift pulse to the image sensor 220. Then, the reading control unit 120 performs supply of a read-out clock to the image sensor 220 and instructs output of the electric charge stored in the shift register to the AFE 110. Thus, the AFE 110 is supplied with the white reference data. Then, the gain adjustment unit 111 of the AFE 110 gain adjusts with regard to the white reference data supplied by the image sensor 220 based on the gain G set in Step S101, and supplies the white reference data to the A/D conversion unit 112. The A/D conversion unit 112 converts the supplied analog data (white reference data) into digital data and supplies the digital data to the data correction process unit 130. Then, the correction data management unit 131 of the data correction process unit 130 stores the white reference data supplied by the A/D conversion unit 112 in the white reference data DB 141.

Further, in a case of reading the black reference data B[X], the reading control unit 120 turns off the LED light source 210, performs provision of a shift pulse to the image sensor 220, and accumulates electric charge in the photoelectric conversion element. After a predetermined length of time passes, the reading control unit 120 instructs transfer of the electric charge accumulated in the photoelectric conversion element to the shift register, by performing provision of a new shift pulse to the image sensor 220. Then, the reading control unit 120 performs supply of a read-out clock with regard to the image sensor 220 and instructs output of the electric charge stored in the shift register to the AFE 110. Thus, the black reference data is supplied to the AFE 110. Then, the gain adjustment unit 111 of the AFE 110 gain adjusts with regard to the black reference data supplied by the image sensor 220 based on the gain G set in Step S101, and supplies the black reference data to the A/D conversion unit 112. The A/D conversion unit 112 converts the supplied analog data (black reference data) into digital data and supplies the digital data to the data correction process unit 130. Then, the correction data management unit 131 of the data correction process unit 130 stores the black reference data supplied by the A/D conversion unit 112 in the black reference data DB 142.

Next, the correction data management unit 131 specifies the black reference data B[X] of the maximum brightness value B[X]_MAX from the black reference data corresponding to one line (plurality of pixels) read in Step S103. Then, the correction data management unit 131 determines whether or not the maximum brightness value B[X]_MAX is equal to greater than the predetermined threshold value $L$ ($=2^K$) (for example, L=32) (Step S104). Alternatively, the correction data management unit 131 determines whether or not the effective highest order bit Z in the black reference data B[X] of the maximum brightness value B[X]_MAX is equal to or greater than the K position integer portion (for example, K=5).

Then, in a case where it is determined that the maximum brightness value B[X]_MAX is equal to or greater than the predetermined threshold value $L$ ($=2^K$) (for example, L=32) or when the effective highest order bit Z in the black reference data B[X] of the maximum brightness value B[X]_MAX is equal to or greater than the K position integer portion (for example, K=5) (Step S104; Yes), since the number of bits below the decimal point (M-K bits) included in the substring having M bits (for example, M=8) that is planned to be extracted from the black reference data B[K] becomes equal to or less than a predetermined value (for example, 2 bits), the correction data management unit 131 does not start reading of the original document and transitions the process to Step S107.

When the process transitions to Step S107, the correction data management unit 131 modifies (resets) the set value (gain G) of the gain adjustment unit 111 (Step S107). Specifically, the correction data management unit 131 resets with regard to the gain G of the gain adjustment unit 111. For example, the correction data management unit 131 performs setting to lower the gain G so as to satisfy the conditional expression below.

Reset gain $G'$<gain $G$×(predetermined threshold value $L$/maximum brightness value $B[X]$_MAX) Condition Expression In addition, the correction data management unit 131 requests reacquisition of black reference data to the reading control unit 120 and returns the process to Step S102.

When the process returns to Step S102, after executing Step S102 described above, the reading control unit 120 performs reacquisition of black reference data in Step S103 (Step S103). Specifically, similarly to Step S103 described above, the reading control unit 120 turns off the LED light source 210, performs provision of a shift pulse to the image sensor 220, and accumulates electric charge in the photoelectric conversion element. After a predetermined length of time passes, the reading control unit 120 instructs transfer of the electric charge accumulated in the photoelectric conversion element to the shift register by performing provision of a new shift pulse to the image sensor 220. Then, the reading control unit 120 performs supply of a read-out clock to the image sensor 220 and instructs output of the electric charge stored in the shift register to the AFE 110. Thus, the black reference data is supplied to the AFE 110.

Then, the gain adjustment unit 111 of the AFE 110 gain adjusts with regard to the black reference data supplied by the image sensor 220 based on a set value (reset gain G') reset in Step S107 and supplies the black reference data to the A/D conversion unit 112. Here, the position of the effective highest order bit Z of the black reference data (black reference data of the maximum brightness value B[X]_MAX) gain adjusted based on the reset set value becomes lower when compared to before the resetting.

Thereafter, the A/D conversion unit 112 once again converts the supplied analog data (black reference data) into digital data and supplies the digital data to the data correction process unit 130. Then, the correction data management unit 131 of the data correction process unit 130 stores the black reference data supplied by the A/D conversion unit 112 in the black reference data DB142.

Then, the processes of Steps S102 to Step S104 and Step S107 described above are repeatedly executed until the maximum brightness value B[X]_MAX becomes less than the predetermined threshold value L ($=2^K$) (for example, L=32) or until the effective highest order bit Z in the black reference data B[X] of the maximum brightness value B[X]_MAX becomes less than the K position integer portion (for example, K=5). Thus, a substring in which the number of bits below the decimal point (M-K bits) becomes equal to or greater than a predetermined value (for example, 3 bits) becomes extractable from the black reference data B[X].

Then, in Step S104, in a case where it is determined that the maximum brightness value B[X]_MAX is less than the predetermined threshold value L ($=2^K$) (for example, L=32) or that the effective highest order bit Z in the black reference data B[X] of the maximum brightness value B[X]_MAX is less than the K position integer portion (for example, K=5) (Step S104; No), the correction data management unit 131 transitions the process to Step S105.

When the process transitions to Step S105, the correction data management unit 131 generates correction data M[X] used in shading correction (Step S105). Specifically, the correction data management unit 131 extracts a substring having M higher order bits (for example, M=8) from the white reference data W[X] having N bits (for example, N=16) read in Step S103. In addition, the correction data management unit 131 extracts a substring corresponding to M bits (for example, M=8) in an order lower than the effective highest order bit Z from the black reference data B[X] having N bits (for example, N=16) read in Step S103. Here, the correction data management unit 131 synthesizes the substring (M bits) extracted from the white reference data W[X] with the substring (M bits) extracted from the black reference data B[X] and generates correction data M[X] (N bits).

Then, the correction data management unit 131 stores the generated correction data M[X] on the correction data DB143 and transitions the process to Step S106.

When the process transitions to Step S106, the reading control unit 120 starts reading of the original document (Step S106) and completes the flow.

Naturally, the image data read by the reading control unit 120 is supplied to the data correction process unit 130 and the shading correction unit 132 performs shading correction with regard to the appropriate image data using the correction data M[X] generated in Step S105.

By performing the image reading processes as described above, in a case where a substring of one part is extracted from the read black reference data B[X] (the number of gradations is lowered), the image reading apparatus 50 of the embodiment can extract a substring including preferably many bit numbers below a decimal point. For that reason, image deterioration after a shading process due to the lowering of the number of gradations of the black reference data B[X] can be prevented.

In addition, each process unit of each flow described above has been divided according to the main process contents in order to facilitate understanding of the image reading apparatus 50. The invention is not limited by the means of categorizing or the names of the process steps. The processes that are performed by the image reading apparatus 50 can be divided into still more process steps. Further, one process step may execute still more processes.

Further, the embodiment described above is intended to exemplify the gist of the invention and is not intended to limit the invention. It is evident to those skilled in the art that various substitutes, corrections, and modifications may be made.

For example, in the embodiment described above, correction data M[X] having N bits (16 bits) is generated by making each of the read data (image data), the white reference data W[X], and the black reference data B [X] N bits (16 bits) and extracting M bits (8 bits) of each of the white reference data W[X] and the black reference data B[X]. However, the invention is not limited thereto. For example, a substring each having a different number of bits may be extracted from the white reference data W[X] and the black reference data B[X].

What is claimed is:

1. An image reading apparatus that performs shading correction by decreasing a number of gradations of white reference data and black reference data to below a number of gradations of image data to be read, comprising:
   a gain setting section that sets a gain of a signal output by an image sensor;
   a reference data reading section that reads the white reference data and the black reference data amplified by the gain;
   an image reading section that reads the image data amplified by the gain;
   a correction data generation section that generates correction data by synthesizing a substring extracted from the white reference data with a substring extracted from the black reference data; and
   a correction section that performs shading correction of the image data read by the image reading section by using the correction data,
   wherein in a case where the black reference data is equal to or greater than a predetermined threshold value L,
   the gain setting section performs resetting to lower the gain that has been set, the reference data reading section rereads the black reference data using the reset gain, and the correction data generation section generates correction data by synthesizing the substring of the white reference data with the substring of the black reference data that has been reread.

2. The image reading apparatus according to claim 1, wherein pixels corresponding to one line are included in the black reference data, wherein in a case where a maximum brightness value of the black reference data is equal to or greater than the predetermined threshold value L, the gain setting section resets the gain to a gain equal to or less than Gx (the predetermined threshold value L/maximum brightness value of the black reference data) (provided that G is a set gain).

3. The image reading apparatus according to claim 1, wherein in a case where a substring extracted from the black reference data is M bits, the predetermined threshold value L is {a power (M-minimum number of bits required to be assigned below the decimal point) of 2}.

4. The image reading apparatus according to claim 1, wherein the reference data reading section reads white reference data having 16 bits for each pixel and black reference data having 16 bits for each pixel, and wherein the correction data generation section generates correction data by synthesizing a substring having 8 bits included in the white reference data with a substring having 8 bits included in the black reference data.

* * * * *